(12) United States Patent
Nomura et al.

(10) Patent No.: US 8,160,431 B2
(45) Date of Patent: Apr. 17, 2012

(54) IMAGE REPRODUCTION SYSTEM AND DEVICE, IMAGE CAPTURE DEVICE, AND INFORMATION PROCESSING DEVICE

(75) Inventors: Masaru Nomura, Tokyo (JP); Hiroki Masuda, Kanagawa (JP); Eriko Matsumura, Kanagawa (JP)

(73) Assignee: Sony Corporation (JP)

( * ) Notice: Subject to any disclaimer, the term of this patent is extended or adjusted under 35 U.S.C. 154(b) by 1679 days.

(21) Appl. No.: 11/484,894

(22) Filed: Jul. 12, 2006

(65) Prior Publication Data

US 2007/0047915 A1    Mar. 1, 2007

(30) Foreign Application Priority Data

Aug. 31, 2005  (JP) ................................ 2005-252536

(51) Int. Cl.
*H04N 5/928* (2006.01)
*H04N 5/76* (2006.01)
*H04N 5/93* (2006.01)
*H04N 5/222* (2006.01)
*G06F 3/00* (2006.01)
*G06F 3/048* (2006.01)

(52) U.S. Cl. ..................... 386/338; 386/280; 348/231.4; 348/333.02; 715/708; 715/768

(58) Field of Classification Search .................. 386/96, 386/52, E5.072; 348/231.4, 333.02; 715/708, 715/768
See application file for complete search history.

(56) References Cited

U.S. PATENT DOCUMENTS 6,753,882 B2 * 6/2004 Nakazawa et al. ............ 715/708
7,239,348 B2 * 7/2007 Miyazaki ................... 348/231.4

FOREIGN PATENT DOCUMENTS

| JP | 2001290490 A | 10/2001 |
|----|--------------|---------|
| JP | 2001-339682 A | 12/2001 |
| JP | 2005-056289 A | 3/2005 |

OTHER PUBLICATIONS

Office Action from Japanese Application No. 2005-252536, dated Mar. 9, 2010.

* cited by examiner

*Primary Examiner* — Thai Tran
*Assistant Examiner* — Syed Hasan
(74) *Attorney, Agent, or Firm* — Lerner, David, Littenberg, Krumholz & Mentlik, LLP

(57) ABSTRACT

An image reproduction system configured by an image reproduction device that can accumulate a still image or a moving image for reproduction, and an information processing device that makes a setting to the image reproduction device. The image reproduction device includes: image data recording means recorded with image data; audio data recording means recorded with audio data; setting information recording means recorded with setting information about the audio data recorded on the audio data recording means; a display section displaying thereon the image data recorded on the image data recording means; an audio output section outputting the audio data recorded on the audio data recording means; and a control section making a selection from the audio data for output from the audio output section based on preset details when the image data is displayed on the display section in a predetermined manner, and the information processing device includes: an identification section acquiring, for identification, the setting information about the audio data recorded on the setting information recording means in the image reproduction device; an audio data recording section recorded with audio data; and an audio data process section converting the audio data recorded on the audio data recording section into a predetermined format based on the setting information about the audio data identified by the identification section, and forwarding resulting audio data to the image reproduction device for recording to the audio data recording means.

10 Claims, 5 Drawing Sheets

EXEMPLARY SYSTEM CONFIGURATION

EXEMPLARY SYSTEM CONFIGURATION

EXEMPLARY AREA CONFIGURATION OF INTERNAL MEMORY

EXEMPLARY MUSIC DATA TRANSFER PROCESS

EXEMPLARY DISPLAY

EXEMPLARY DISPLAY ON CAMERA SIDE

IMAGE REPRODUCTION SYSTEM AND DEVICE, IMAGE CAPTURE DEVICE, AND INFORMATION PROCESSING DEVICE

CROSS-REFERENCE TO RELATED APPLICATIONS

The present application claims priority from Japanese Patent Application No. JP 2005-252536 filed on Aug. 31, 2005, the disclosure of which is hereby incorporated by reference herein.

BACKGROUND OF THE INVENTION

1. Field of the Invention

The present invention relates to an image reproduction system and device, an image capture device, and an information processing device and, more specifically, to a technology suitable for an image capture device called digital camera to reproduce images in storage.

2. Description of the Related Art

A camera device called digital camera displays a captured still or moving image for user perception. The captured image is stored in a memory card or others inserted to the camera device, and the image is displayed on a relatively small-sized display equipped to the camera device. The camera device has a reproduction function called slide show reproduction, and sequentially reproduces captured and accumulated still images on a display on an image-by-image basis each for a few seconds.

With such image reproduction in a slide show in the device provided with the image reproduction function, e.g., previous camera device, images simply appear one after another, and thus there has been a demand for more advanced processing. For example, if an internal speaker outputs background music (BGM) during a slide show, the image reproduction can be performed with effects.

For output of BGM, the camera device is required to store therein audio data. If users want to accumulate any arbitrary music for use as the audio data, there is a possible technology of downloading the audio data from outside sources to a memory or others whatever equipped in a so-called portable audio reproduction device.

Patent Document 1 (JP-A-2005-56289) describes an exemplary process of content management with which downloaded audio is accumulated in an audio reproduction device, and accumulated audio data is reproduced.

SUMMARY OF THE INVENTION

As with Patent Document 1, the technology of downloading audio data to an audio reproduction device has been variously developed. The audio data is acquired by an information processing device, e.g., personal computer device, over the Internet or others through a connection established between the information processing device and the reproduction device. The issue here is that this previous technology is developed with a presumption that the audio reproduction device side is ready for the advanced audio reproduction process, i.e., on the computer device side, the audio data is transferred to an audio data file in a memory of the audio reproduction device, and the transferred audio data is reproduced in the audio reproduction device.

Therefore, if such a technology developed for a portable audio reproduction device of a previous type is applied as it is to the audio reproduction function of a level for use for a slide show in the aforementioned digital camera, it means a need arises for the digital camera itself to have an advanced function to execute an audio reproduction process. This is thus considered not preferable. What is more, in the digital camera, if the audio data is allowed to be freely stored in an internal memory of a limited memory capacity, this means that the memory capacity that is supposed to be available for images as the camera device is limited. This is also considered not desirable. If with a portable audio reproduction device, as is originally designed for audio reproduction, the device is capable for various operations for audio reproduction, e.g., tune selection prior to reproduction. Such functions for audio reproduction operations are complicated, and it is thus not considered preferable to provide such functions to the digital camera only for audio reproduction of a level for use for a slide show.

Exemplified above is the case with the image reproduction in a slide show using a digital camera. If for audio reproduction at the time of image reproduction using a relatively small-sized terminal of a similar type, the same problems as above will occur. The problem caused when the audio data is transferred to a terminal, e.g., digital camera, is also observed when various types of data is transferred to a terminal being relatively limited in function.

It is thus desirable to enable smooth audio data exchange for audio reproduction at the same time as image reproduction utilizing an image reproduction function.

An embodiment of the invention is directed to a device including: for reproduction control over accumulated still images or moving images, an image data recording section recorded with image data; an audio data recording section recorded with audio data; and a setting information recording section recorded with setting information about the audio data recorded on the audio data recording section. When the image data is displayed on a display section in a predetermined manner, executed is an audio output process of selecting and outputting the audio data based on preset details. The device is connected to an information processing device, including an identification section that acquires, for identification, the setting information about the audio data recorded on the setting information recording section; an audio data recording section recorded with audio data; and an audio process section that converts the audio data recorded on the audio data recording section into a predetermined format based on the setting information about the audio data identified by the identification section, and forwards the resulting audio data to the connected device for recording to the audio data recording section.

Such a configuration enables to output any prepared audio data simultaneously when the image data is displayed, and to replace the audio data with another if such a command comes from the information processing device. At the time of such data replacement, the data is changed in format and size to conform to the device prior to writing.

According to the embodiment of the invention, any prepared audio data can be output simultaneously when the image data is displayed, and the audio data can be replaced with another if such a command comes from any other device. At the time of such data replacement, by the process executed by any external device such as computer device connected to the device, the data is changed in format and size to conform to the device prior to writing. This favorably allows users to record the audio data without going through complicated operations, e.g., format or bit rate setting specifically for the device. What is more, the resulting audio data will be reduced

DETAILED DESCRIPTION

Figure 1:
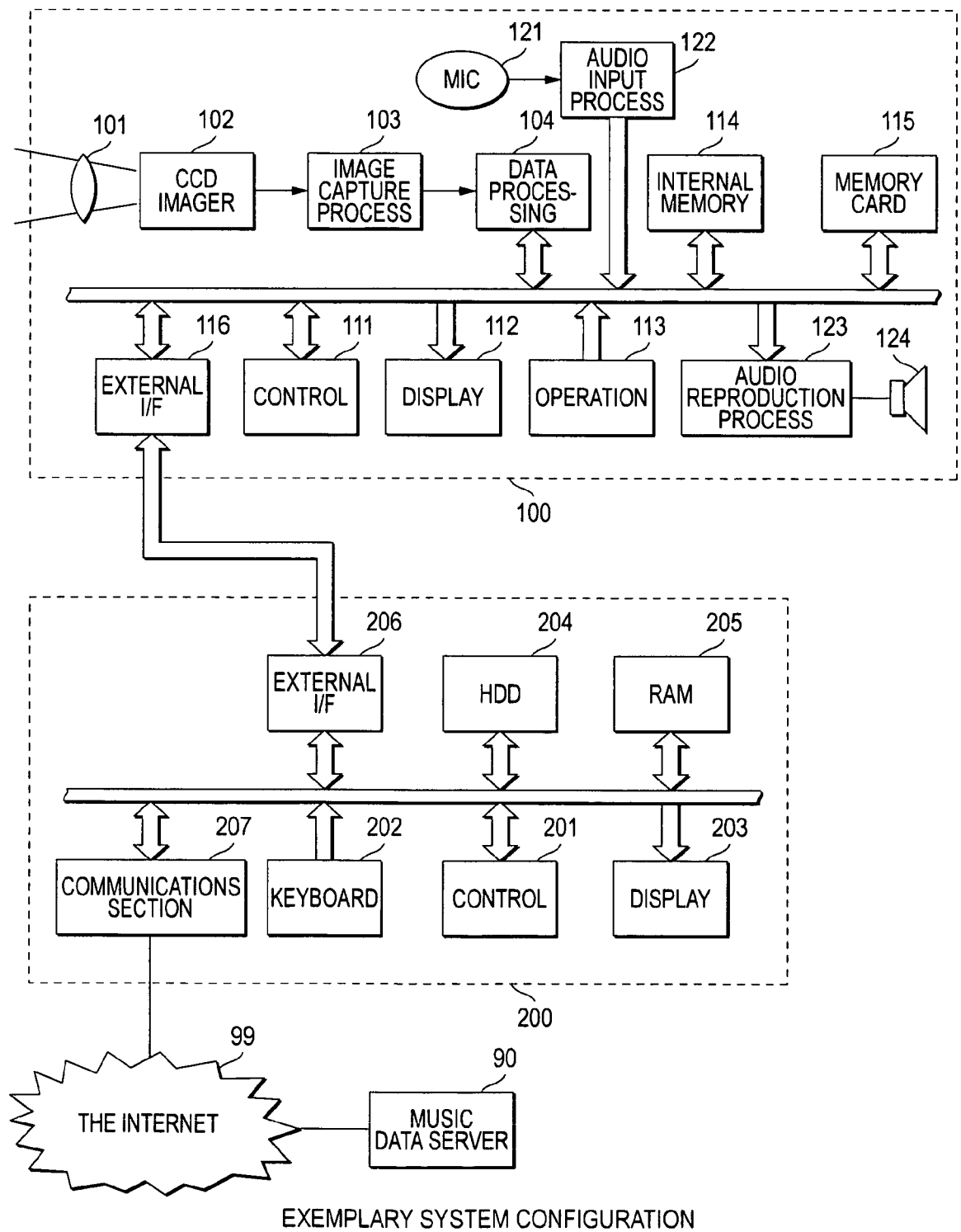
FIG. 1 is a diagram showing an exemplary system configuration in an embodiment of the invention.

In the below, an embodiment of the invention is described by referring to the accompanying drawings.

Exemplified here is a system configured by a digital camera device and a personal computer device. The digital camera device captures images, i.e., still images and moving images, and the personal computer device is connected to the digital camera device. Described first is the configurations of such devices by referring to FIG. 1.

A digital camera 100 extracts, as an electric image capture signal, light of an image formed on an image capture element, i.e., CCD (Charge Coupled Device) imager 102, via an optical system 101 exemplified by a lens or others. The image capture signal is supplied to an image capture process section 103 so that image data is derived. The image data is supplied to a data process section 104 from the image capture process section 103, and is subjected to various data processes on a frame basis, i.e., format change to a predetermined format, compression if with moving image data, or others.

The digital camera device 100 of this embodiment is detachable with a memory card 115 in the predetermined shape, e.g., stick, and is equipped with an internal memory 114 separately from the memory card 115. The internal memory 114 and the memory card 115 are both a nonvolatile memory. The image data provided by the data process section 104 can be stored in the memory card 115 or the internal memory 114 under the control of a control section 111. When images are captured, the image data is subjected to a display process after supplied to a display section 112, which is configured by a liquid crystal panel or others attached to the body of the digital camera device 100. The captured image data stored in the internal memory 114 and the memory card 115 can be displayed on the display section 112 through operation of an operation section 113, which is configured by operation keys, a touch panel, and others.

The captured image data is displayed in a display mode in which images are designated for display one by one through key operation or others. Other than such a display mode, a slide show display mode is also available in which a plurality of still images stored in the memory are sequentially displayed on an image-by-image basis each for a few seconds. In such a slide show display mode, background music (BGM) is made to be output (reproduced). The details about the process for BGM output will be left for later description.

The digital camera device 100 of this embodiment is equipped with a microphone 121. The microphone 121 picks up audio signals, and outputs the audio signals to an audio input process section 112 for format conversion. The resulting audio data in a predetermined format can be stored in the memory card 115 or the internal memory 114. Such storage of audio data to the memory 114 or 115 is performed also under the control of the control section 111. If encoding is performed in the audio input process section 112, the audio data is encoded to data of MPEG (Moving Picture Experts Group)-1 layer 2, for example. For whether the resulting audio data is stored or not, the mode setting for image capture is a determination factor. Although the audio data is often stored mainly when moving images are captured and stored, alternatively, another mode may be provided to store audio about for a few seconds when still images are captured. The audio data derived as a result of image capture, whichever moving or still images, is stored in an image data file as the data accompanying the image data. The image data file will be described later.

When the image data accompanied with the audio data is read from the memory 114 or 115 for display on the display section 112, the audio data is supplied to an audio reproduction process section 123 for demodulation or analog conversion therein for reproduction. The resulting data is output from a connected speaker 124.

In the digital camera device 100 of this embodiment, an external interface section 116 is connected to circuit components via an internal bus so that external equipment can be connected thereto. The external interface section 116 is provided with a port for connection with a universal serial bus (USB), for example, and can be connected to a computer device or others. When a connection is established via the external interface section 116 with any external equipment such as computer device, the external equipment side recognizes the data stored in the internal memory 114 and/or the memory card 115 for data writing and reading.

Figure 2:
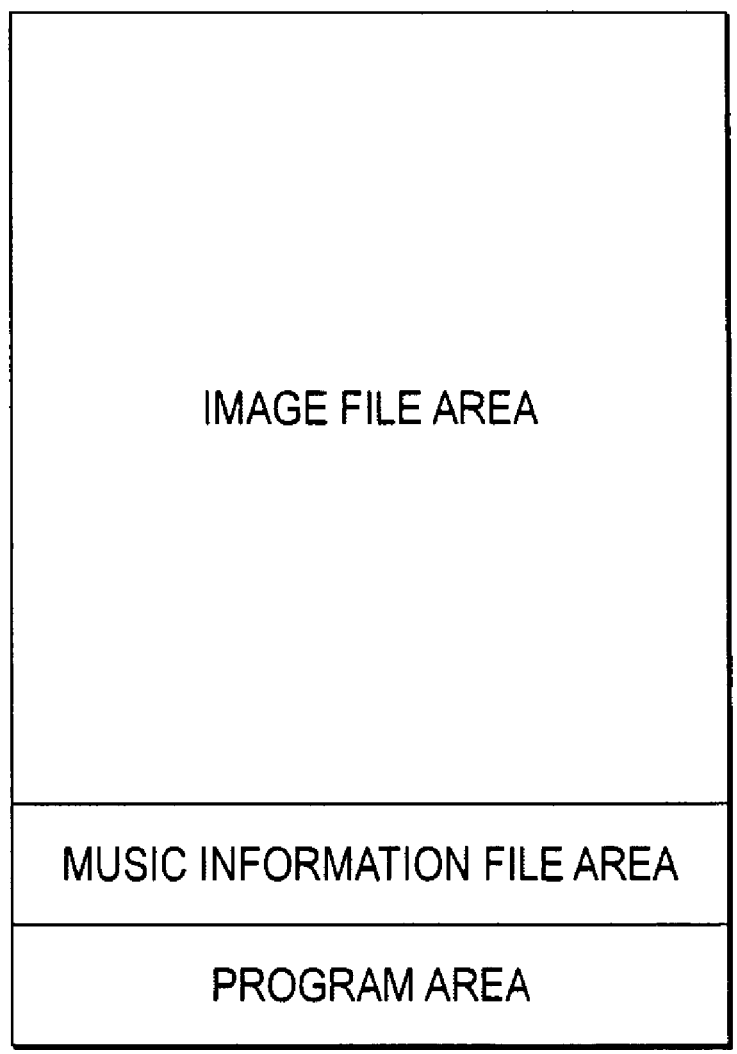
FIG. 2 is a diagram showing an exemplary area configuration in a memory in the embodiment of the invention.

As shown in FIG. 2, the internal memory 114 of the digital camera device 100 includes an image file area for storage of image data, a music information file area for storage of music information, and a program area for storage of program data operating the camera device. The program area stores therein a program for operating the digital camera device 100, and the music information file area stores therein music information for use as BGM. The music information for use as BGM is stored as music data (audio data) of MPEG-1 layer 2, sharing the same format as for the data of audio picked up by the aforementioned microphone 121. In this embodiment, presumably, the format can be recorded with four tunes at the maximum, i.e., each tune carries the music data of about the predetermined level. The stored tunes each carry the music data of 180 seconds at the maximum. Alternatively, the music data may be stored by fading in the starting portions of the corresponding tune, and fading out the ending portions thereof. In this embodiment, the music data is previously defined by maximum volume or maximum reproduction time prior to recording to the music information file area. This thus enables to make a setting in advance how many music data can be recorded to the music information file area. There is also an encoding format for music data that can be decoded by the audio reproduction process section 123 serving as the music data decoding section of the camera device. The music information file area is previously provided with setting data about the music data for storage therein. The setting data is stored, separately from the music data, as the setting information about the music data.

This setting data includes, for example,
1. the number of music data, e.g., the number of tunes, possibly recorded in the music information file area,
2. the type of encoding format for music data possibly decoded by the camera device, 3. the maximum volume per music data possibly reproduced by the camera device,
4. the maximum reproduction time per music data possibly reproduced by the camera device, and
5. the bit rate suitable for reproduction of music data encoded by the camera device.

Described next is the configuration of a computer device 200 connected to the digital camera device 100 of this embodiment. The configuration of the computer device 200 of FIG. 1 is general for a personal computer device. That is, the computer device 200 is configured to include: a control section 201 in charge of various types of computation and control exercise; a keyboard 202 for user operation; a display section 203 configured by a computer display; a hard disk drive section 204 for storing (accumulate) various types of programs, downloaded music and video data, and others; a RAM 205 being a memory for use for data computation or others; an external interface section 206 for connection with peripheral equipment; and a communications section 207 for connection to the Internet 99. If with a notebook computer device, these components are collectively disposed in a cabinet, and if with a desk top computer device, the keyboard 202 and the display section 203 are often separately disposed.

The computer device 200 becomes accessible to a music data server 90, for example, if connected to the Internet 99 via the communications section 207. The computer device 200 can download tunes whatever desired by a user, and can store those to the hard disk drive section 204 or others. In the hard disk drive section 204 in this embodiment, software is installed for management of the digital camera device 100, and can be accessed for activation as appropriate.

With the software for management of the digital camera device 100, the music information for use as BGM can be managed. The music information is the one stored in the music information file area in the memory 114 of the digital camera device 100. The software includes the same music data as the data in the music information file area stored in the internal memory 114 when the digital camera device 100 is shipped out. Using the music data, the music data in the digital camera 100 can be put back to its original state. This software includes software for converting the audio data in the computer device into data of MPEG-1 layer 2 in the audio data format conforming to the digital camera device 100.

By referring to the flowchart of FIG. 3, described next is an exemplary process by the software activated by the computer device 200 for managing the digital camera device 100, i.e., process for managing the music information for use as BGM. As shown in FIG. 1, first of all, the computer device 200 and the digital camera device 100 are directly connected to each other using a USB cable or others (step S11), and then the corresponding software is activated (step S12). Once the software is activated, executed next is a recognition process to the recording data in the internal memory 114 of the digital camera device 100. In this recognition process, a determination is made whether the music information file area includes the setting data (FIG. 2) (step S13). If the determination is made that the music information file area includes no setting data, the display section 203 of the computer device 200 displays thereon a message telling "no digital camera for music data writing", and this is the end of the procedure (step S19).

When the determination is made that the music information file area includes the setting data, in step S14, executed is a process of checking the details of the setting data by the computer device 200 (step S14). At this time, the computer device 200 determines the format or others for the music data possibly reproduced by the digital camera device 100, and then determines whether the music data of the format can be created thereby (step S15). With the determination of NO, the procedure goes to step S19, and an error message is displayed.

When it is determined that the music data can be created for reproduction in step S15, based on the information acquired from the setting data, the display section 203 GUI-displays thereon the number of BGM tunes possibly stored in the music information file area in the internal memory 114 of the digital camera device 100 (step S16).

Figure 4A:
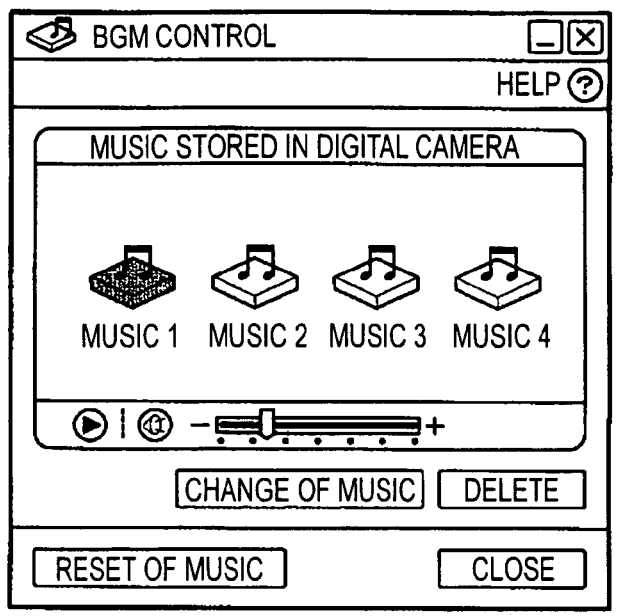
FIGS. 4A to 4C are each a diagram showing an exemplary display on a display of a computer device in the embodiment of the invention.

FIG. 4A shows an exemplary GUI display in this case. In this example, displayed are graphics each indicating a tune, tune titles (Music1, Music2, Music3, and Music4), a reproduction button, a volume control, a tune change button, a tune deletion button, a reset button to put every tune back to its initial state, and the like.

With such GUI display, the user operates the keyboard or others to select any of the tune graphics, and depresses the reproduction button. This responsively reads out the corresponding music data from the internal memory 114 for transfer to the computer device 200. The music data is then reproduced utilizing the music reproduction function in the computer device 200.

Figure 3:
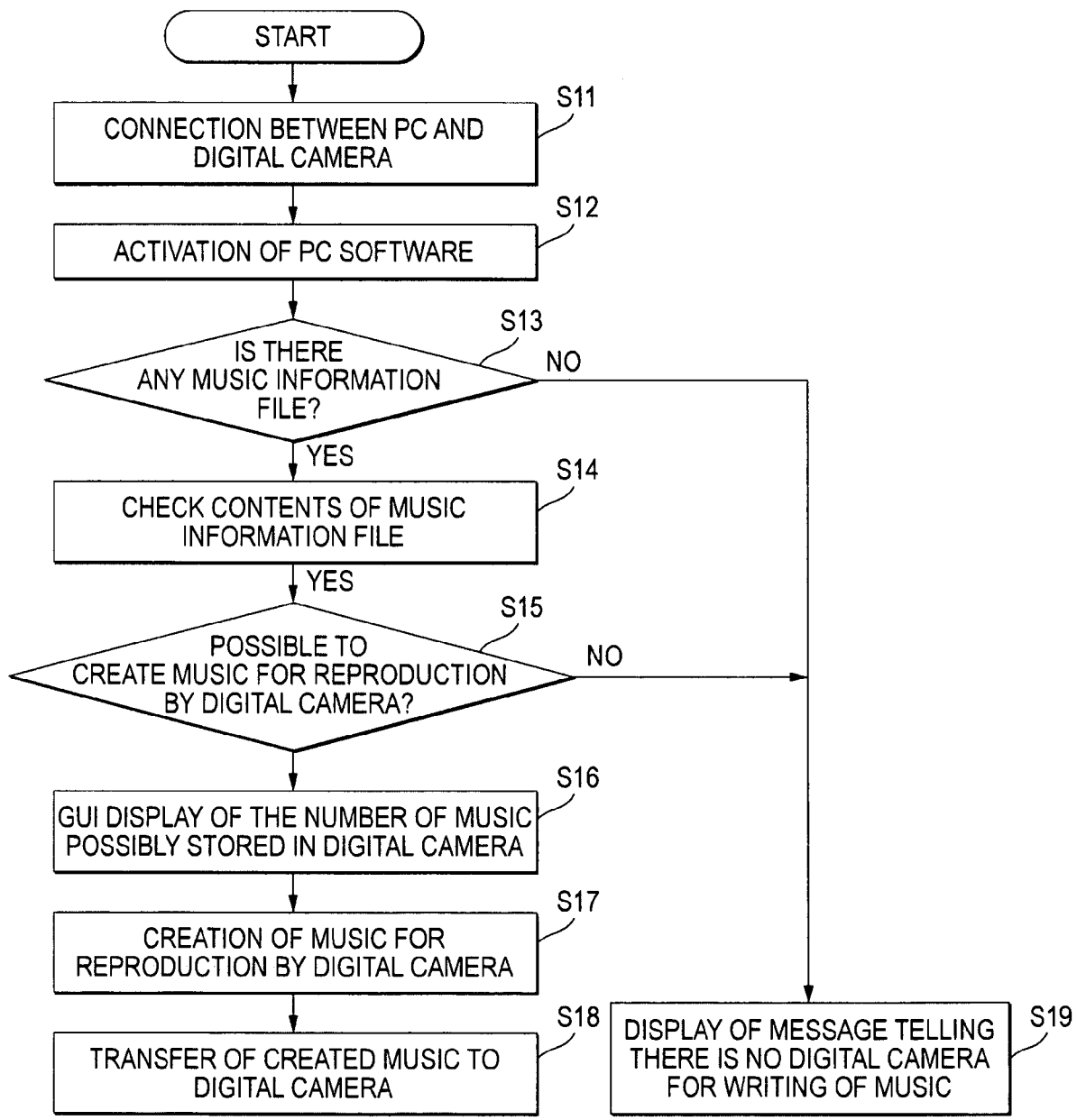
FIG. 3 is a flowchart showing an exemplary music data transfer process in the embodiment of the invention.

Referring back to the flowchart of FIG. 3, when any tune change is made on the GUI display in step S16, a data creation process is executed (step S17). That is, the list of music data accumulated in the computer device 200 is displayed for user to select his or her preferred tune. The music data of the selected tune is converted into the music data possibly reproduced by the digital camera device 100. The resulting music data is transferred to the digital camera device 100 using a USB cable or others for connection, and replaces the music data of the corresponding tune in the music information file in the internal memory 114 of the camera device 100 (step S18).

When the music data is created in step S17, the format change is made to derive data of MPEG-1 layer 2, and the bit rate is also changed to be suitable for storage to the digital camera device. When the length of tune is longer than 180 seconds, the data covers only 180 seconds from the starting portion. If necessary, the starting portion is faded in, and the ending portion is faded out. The information found in the setting data acquired in step S14 is used for creation of the music data. That is, the processes in step S17, i.e., format change of the music data, bit rate determination suitable for the digital camera device, and length determination for a tune, are executed based on information in the setting data, i.e., the encoding format type of the music data possibly decoded by the digital camera device, the bit rate suitable for recording to the digital camera device, and the maximum reproduction time per tune possibly reproduced by the digital camera device.

Figure 4B:
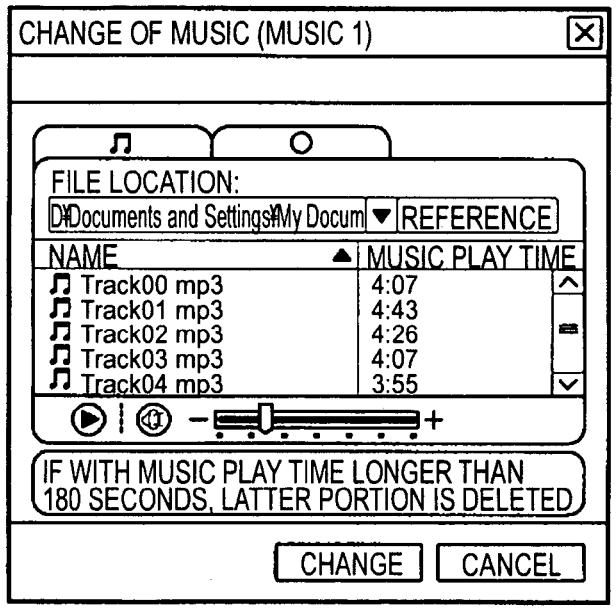
Figure 4C:
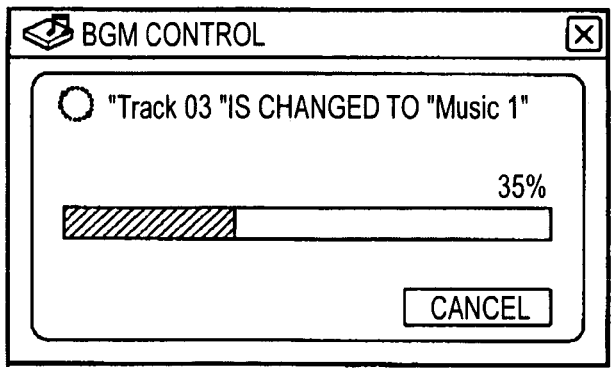

FIG. 4B shows an exemplary screen display when the user makes a tune change operation. In this example, "Music1" is selected out of four tunes for a change, and the list (tune titles and time) is displayed for the music data in the storage location (file) of the music data available for replacement. The music data for replacement varies in type, including data downloaded from the Internet, data read from music disks, and others. At this time, a warning message is displayed, telling "If with music play time longer than 180 seconds, latter portion is deleted". In response to a user operation, i.e., any of the displayed tunes is selected, and then the change button is depressed, the process is started to change the data of "Music1" to the selected tune. During such a process, as shown in FIG. 4C, the display section 203 displays thereon a message telling the progress of the change process.

With the GUI display of FIG. 4A, when the tune reset button is depressed, the music data provided in the currentlyin-progress program for initial setting is forwarded to the digital camera device 100 so that the music data is put back to its initial state. Herein, the setting data recorded in the music information file area can be restored using the restoration data recorded in the program area in the memory of the digital camera device 100.

Figure 5A:
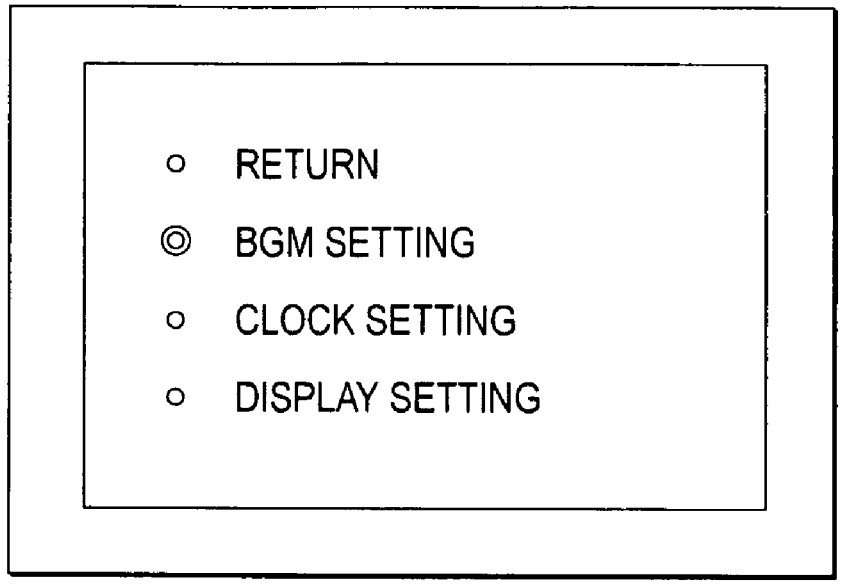
FIGS. 5A and 5B are each a diagram showing an exemplary display on a display section of a camera device in the embodiment of the invention.
Figure 5B:
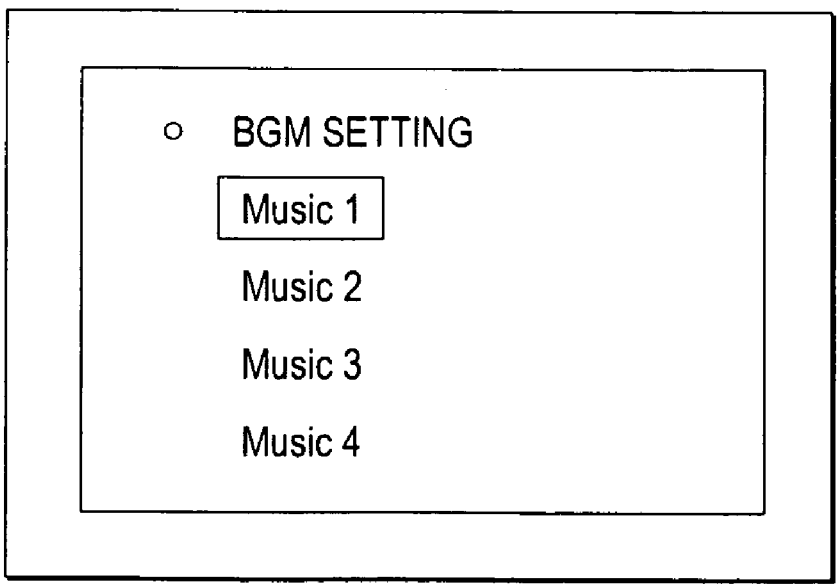

Because the music data for BGM use can be recorded in the memory of the digital camera device 100 in this way, the user can set any arbitrary tune for use as BGM, and at the time of slide show display of images, the user-set music is output as BGM from the speaker 124. The reproducing tune can be selected through operation on the side of the digital camera device 100. For example, as shown in FIG. 5A, the menu screen for use to make various settings is displayed on the display section 112 of the camera device 100. After "BGM setting" is selected, as shown in FIG. 5B, the list is displayed for the four tunes prepared in the memory 114. When the user selects his or her desired tune in this state, the selected tune is set to be output as BGM. Herein, although a tune is 180 seconds at the maximum, if with a slide show display of 180 seconds or longer, the same tune is repeatedly reproduced.

In the embodiment described above, the storage area of a music information file provided in the memory 114 of the digital camera device 100 is fixed in storage capacity. This is not restrictive, and the storage capacity may be made variable through operation on the side of the computer device 200 to enable storage of a large number of tunes or longer tunes. Alternatively, when only one BGM tune is needed, the storage area is reduced in the music information file, and the capacity available for storage of image data or others may be increased.

In the aforementioned embodiment, described is the case of outputting the music data stored in the digital camera device as BGM for a slide show. Alternatively, the music data may be output in other cases, or the music reproduction may be solely performed with no correlation to image reproduction.

In the aforementioned embodiment, described is the case that the computer device identifies the setting data stored in the memory of the digital camera device, i.e., terminal device, for recording or replacing of the music data. Alternatively, any external device may identify the various types of data stored in the memory of other terminal devices, e.g., format, data amount, and length. Every time the external device performs data replacing, the data may be converted as appropriate for data rewriting, e.g., format, data amount, and length. The external device is not necessarily a computer device as long as being an information processing device capable of a data process as such.

It should be understood by those skilled in the art that various modifications, combination, sub-combinations, and alterations may occur depending on design requirements and other factors insofar as they are within the scope of the appended claims or the equivalents thereof.

The invention claimed is:

1. An image reproduction system configured by an image reproduction device that can accumulate a still image or a moving image for reproduction, and an information processing device that makes a setting to the image reproduction device, wherein the image reproduction device includes:
  image data recording means recorded with image data;
  audio data recording means recorded with audio data;
  setting information recording means recorded with setting information about the audio data recorded on the audio data recording means;
  a display section displaying thereon the image data recorded on the image data recording means;
  an audio output section outputting the audio data recorded on the audio data recording means; and
  a control section making a selection from the audio data for output from the audio output section based on preset details when the image data is displayed on the display section in a predetermined manner, and the information processing device includes:
  an identification section acquiring, for identification, the setting information about the audio data recorded on the setting information recording means in the image reproduction device;
  an audio data recording section recorded with audio data; and
  an audio data process section converting the audio data recorded on the audio data recording section into a predetermined format based on the setting information about the audio data identified by the identification section, and forwarding resulting audio data to the image reproduction device for recording to the audio data recording means, in which the image reproduction device is a digital camera and the information processing device is a computer and in which the computer is separate from the digital camera and is connectable thereto by way of a serial bus such that during operation the audio data process section of the computer converts the audio data recorded on the audio data recording section into the predetermined format based on the setting information about the audio data which was recorded on the setting information recording means of the digital camera and which was identified by the identification section of the computer and forwards the resulting audio data to the audio data recording means of the digital camera for recording thereat, and in which the setting information about the audio data recorded on the setting information recording means in the image reproduction device at least includes (i) information about a type of encoding for the audio data that can be recorded to the audio data recording means, (ii) data about a maximum volume of the audio data per music that can be reproduced by the image reproduction device, and (iii) information about a maximum reproduction time of the audio data per music that can be reproduced by the image reproduction device.

2. The image reproduction system according to claim 1, wherein the image reproduction device includes an image capture section, and when the image data is displayed in the predetermined manner on the display section of the image reproduction device, a slide show display is made by which the still images plurally captured by the image capture section and stored in a first storage section are sequentially displayed, and during the slide show display, the audio output section outputs audio as background music.

3. The image reproduction system according to claim 1, wherein based on the setting information about the audio data, the audio data process section in the information processing device converts the audio data recorded on the audio data recording section into a format that can be handled by the audio output section in the image reproduction device, and into a format of a data size recordable by the audio data recording means.

4. The image reproduction system according to claim 3, wherein the format conversion in terms of the data size performed by the audio data process section in the information processing device is a process of deriving data only for a segment from a head of the audio data for reproduction of a predetermined fixed length of time.

5. The image reproduction system according to claim 1, wherein the identification section of the information processing device identifies the number of the audio data possibly stored in the audio data recording means of the image reproduction device, and the number of the audio data stored in the audio data recording means, and the display process section displays thereon identification results as GUI images.

6. The image reproduction system according to claim 1, wherein based on a predetermined operation, the audio data process section of the information processing device restores the audio data stored in the audio data recording means of the image reproduction device to be in an initial state.

7. The image reproduction system according to claim 1, in which after activation, the audio data process section in the information processing device determines whether encoded audio data of the type indicated by the setting information can be created by the information processing device and when a result thereof indicates that the encoded audio data of the type indicated by the setting information can be created automatically converts the audio data recorded on the audio data recording section into an encoding format that can be handled by the audio output section in the image reproduction device based on the setting information about the audio data.

8. An information processing device that makes a setting to an image reproduction device capable of recording a still image or a moving image for reproduction, comprising:

an identification section identifying setting information about audio data stored in a predetermined storage section in the image reproduction device;

a display process section subjecting an identification result of the identification section to a display process at a predetermined position;

an audio data recording section recorded with audio data; and an audio data process section converting the audio data recorded on the audio data recording section into a predetermined format based on the setting information about the audio data identified by the identification section, and forwarding resulting audio data to the image reproduction device for recording, in which the image reproduction device is a digital camera and the information processing device is a computer and in which the computer is separate from the digital camera and is connectable thereto by way of a serial bus such that during operation the audio data process section of the computer converts the audio data recorded on the audio data recording section into the predetermined format based on the setting information about the audio data which was stored in the predetermined storage section of the digital camera and which was identified by the identification section of the computer and forwards the resulting audio data to the digital camera for recording thereat, and in which the setting information in the image reproduction device at least includes (i) information about a type of encoding for the audio data that can be recorded in the image reproduction device, (ii) data about a maximum volume of the audio data per music that can be reproduced by the image reproduction device, and (iii) information about a maximum reproduction time of the audio data per music that can be reproduced by the image reproduction device.

9. The information processing device according to claim 8, wherein the audio data process section converts a data size of the audio data to derive data only for a segment from a head of the audio data for reproduction of a predetermined fixed length of time.

10. The information processing device according to claim 8, wherein the identification section identifies the number of the audio data possibly stored in a predetermined storage section of the image reproduction device, and the number of the audio data stored in the predetermined storage section based on the acquired setting information about the audio data, and the display process section displays thereon identification results as GUI images.

* * * * *